June 23, 1953  A. LUCCHESI  2,643,133
ANIMAL SIMULATING ATTACHMENT FOR BICYCLES
Filed July 17, 1950
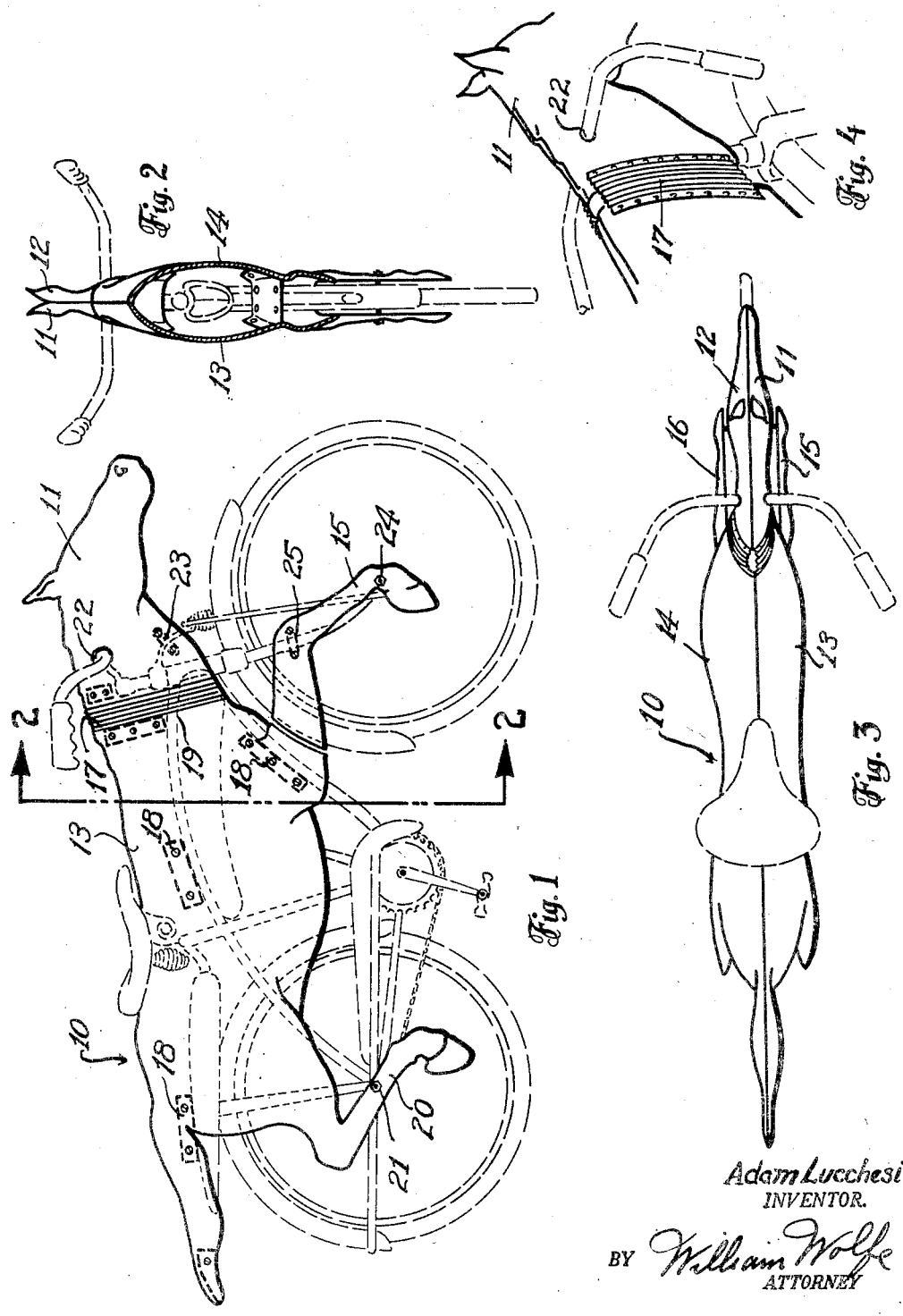
Adam Lucchesi
INVENTOR.
BY William Wolfe
ATTORNEY Patented June 23, 1953

2,643,133

UNITED STATES PATENT OFFICE 2,643,133

ANIMAL SIMULATING ATTACHMENT FOR BICYCLES

Adam Lucchesi, Bergenfield, N. J.

Application July 17, 1950, Serial No. 174,307

1 Claim. (Cl. 280—1.202)

My invention relates to toys for children, and more particularly to pictorial amusement devices suitable for attaching to vehicular machines such as bicycles, to cause them to resemble well known or epic animals.

Most children like to imagine themselves as men of the "Old West" and derive great pleasure from imitating and aping cowboys, fictional characters and Western actors reminiscent of the West such as Hopalong Cassidy and Gene Autry, etc. However, as all of these characters and actors continuously rode horseback, imitation afoot becomes difficult and to practically all children, horses are non-available.

Therefore, it is an object of this invention to provide pictorial elements which can be attached to the sides of bicycles to cause them to resemble specific famous horses so that the rider can imagine himself to be the actor, character or cowboy owner of the horse.

A second object is to provide pictorial elements which can be attached easily to the sides and handle bars of a bicycle, causing it to resemble a horse in contour and outline and to have the head of the horse attached to the handle bars capable of moving relative to the body which is attached to the frame to the rear of the front wheel.

A third object is to provide pictorial attachments for bicycles which can be attached easily and which will aid the rider in producing an illusion that he is riding other than a bicycle.

A fourth object is to produce a bicycle which will give its rider an impression that he is riding other than a bicycle by the use of pictorial elements attached to or formed integral with the frame of the bicycle.

I accomplish these and other objects by forming my pictorial amusement device of several elements together resembling a horse. The elements resembling the head part is secured by flexible coupling to the elements resembling the body part and providing spacers or separators between like opposing elements to retain them apart and to the bicycle with which the device can be used.

For further comprehension of the invention and of the objects and advantages thereof, reference will be had to the following description, the accompanying drawings and to the appended claim in which the various novel features of the invention are more particularly set forth.

In the accompanying drawings forming a material part of this disclosure:

Fig. 1 is a side view of my pictorial amusement device (in the present case a horse) shown positioned on a bicycle, the bicycle being outlined in phantom.

Fig. 2 is a section view along the line 2—2 of Fig. 1.

Fig. 3 is a plan view looking down upon the device and bicycle shown in Fig. 1.

Fig. 4 is a detailed view showing an accordion fashioned neck element secured to both the head and body elements of the horse.

In the drawing and in the specification in which like numerals indicate identical elements, my amusement device 10, is shown mounted upon a bicycle.

The amusement device in the present instance is a characterization of a horse and depicts an animal with its forelegs far out in front and its rear legs drawn up and forward, in the act of galloping. To heighten the enjoyment of the bicycle rider and aid him in his role of an actor or mimic, the device can be formed or drawn to resemble famous animal characters of fiction or life such as the horses "Trigger" and "Silver," or can be formed to represent any other animal, if desired.

The device 10 is comprised of similar but opposing head elements 11 and 12, similar but opposing body elements 13 and 14, similar but opposing forelegs 15 and 16, an accordion neck element 17 and separators or spacers 18 which are strategically positioned throughout the device and between opposing elements to aid in retaining the elements in position and to the bicycle.

The opposing elements are positioned on either side of the bicycle with the body elements 13 and 14 of the horse positioned so that the seat of the bicycle occupies the position normally allocated to a saddle, and the forward end of the body or rear end of the neck 19 of the horse is positioned somewhat to the rear of the handle bars of the bicycle, while the rear legs 20 of the horse are secured upon the rear axle of the bicycle by the nut 21.

The opposing head elements 11 and 12 are positioned at either side of the handle bars which extend through holes 22 in the elements. Clamps 23, positioned on the inside of head elements, aid in retaining the elements in position. The head and body elements are spaced apart to permit the front wheel of the bicycle to turn, but the according neck element 17 which spans the space and is riveted to each element provides an animal continuity and gives an impression of a horse turning his head when the front wheel of the bicycle is turned. Although the neck element 17 has been shown to be accordion-like in structure, many other types of joinder could have been used, such as a telescoping joint or a joint formed of resilient flexible or expansible material.

The opposing forelegs 15 and 16 are carried by the front wheel axle of the bicycle and are held in position by nuts 24 on the axles and by clamps 25. The forelegs are spaced from the body part to permit the front wheel of the bicycle to turn.

The pictorial amusement device 10 here-above described can be assembled easily on a bicycle by simply setting the elements in their proper positions on the bicycle with the axle nuts removed and then replacing the nuts 21 and 24 and then securing the clamps 25 and the spacers 18 in position.

As the details describe and the drawing shows only one form of this invention and since many changes and modifications may be made in the same invention without changing or departing from the spirit and scope of the basic idea, I desire to cover all modifications, forms and embodiments coming within the language of the appended claim.

Having thus described my invention, what I claim as new and desire to secure by United States Letters Patent is:

A pictorial amusement device, resembling an animal, adapted to be attached to a bicycle, comprising separate elements resembling the animal's head, forelegs and body, the body elements including rear legs integral therewith, the head elements being flexibly secured to the body elements, each of the elements provided with openings whereby the handle bars of the bicycle can be inserted in the head elements, the rear axle in the rear leg portions of the body elements, and the front axle in the foreleg elements to retain the device on the bicycle.

ADAM LUCCHESI.

References Cited in the file of this patent

UNITED STATES PATENTS

| Number | Name | Date |
|---|---|---|
| 763,190 | Madonna | June 21, 1904 |
| 922,484 | Jones | May 25, 1909 |
| 1,533,520 | Selenkow | Apr. 14, 1925 |
| 2,044,889 | Ralston | June 23, 1936 |
| 2,177,552 | Ruble | Oct. 24, 1939 |
| 2,212,781 | La Bille | Aug. 27, 1940 |
| 2,225,560 | Hartman | Dec. 17, 1940 |
| 2,344,062 | Rinehart | Mar. 14, 1944 |
| 2,504,000 | Coleman | Apr. 11, 1950 |
| 2,518,899 | Kelleher | Aug. 15, 1950 |